(12) United States Patent
Parks et al.

(10) Patent No.: US 6,886,440 B2
(45) Date of Patent: May 3, 2005

(54) SLIDE MITER SAW

(75) Inventors: James R. Parks, White Hall, MD (US); Steven A. Shull, Parkville, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/644,113

(22) Filed: Aug. 20, 2003

(65) Prior Publication Data

US 2004/0055436 A1 Mar. 25, 2004

Related U.S. Application Data

(60) Provisional application No. 60/411,977, filed on Sep. 19, 2002.

(51) Int. Cl.[7] .............................. B23D 45/04; B27B 5/29
(52) U.S. Cl. ...................... 83/471.3; 83/486.1; 83/581; 83/699.61
(58) Field of Search .................. 83/485–489, 471.3, 83/471.2, 473, 472, 699.61; 384/40, 57

(56) References Cited

U.S. PATENT DOCUMENTS

| | | | |
|---|---|---|---|
| 2,242,336 A | | 5/1941 | Atwood |
| 2,353,088 A | | 7/1944 | Schultz |
| 2,627,880 A | | 2/1953 | Johnson |
| 4,572,591 A | * | 2/1986 | Walter et al. ............... 384/45 |
| 4,869,142 A | | 9/1989 | Sato et al. |
| 5,241,888 A | * | 9/1993 | Chen ........................ 83/471.3 |
| 5,524,516 A | * | 6/1996 | Sasaki et al. ............... 83/471.3 |
| 5,768,967 A | * | 6/1998 | Sasaki et al. ............... 83/471.3 |
| 6,067,885 A | * | 5/2000 | Brunson et al. ........... 83/471.3 |
| 6,179,468 B1 | * | 1/2001 | Thorstens et al. ............ 384/40 |

FOREIGN PATENT DOCUMENTS

| | | | |
|---|---|---|---|
| JP | 11090730 A | | 4/1999 |
| JP | 11090730 | * | 4/1999 |

OTHER PUBLICATIONS

Patent Abstract of Japan, Application No. 10165448.
M. Rijks, European Search Report, Application No. EP 03 02 0166, Jul. 26, 2004, The Hague.
Annex to the European Search Report on European Patent Application No. EP 03 02 0166.

* cited by examiner

*Primary Examiner*—Stephen Choi
(74) *Attorney, Agent, or Firm*—Adan Ayala

(57) ABSTRACT

A miter saw including a base, a table, a support housing connected to the table, first and second rails slidably connected to the support housing, a trunnion disposed on the first and second rails, and a saw assembly pivotally attached to the trunnion and movable between a front position and a rear position. The saw assembly includes a motor and a blade driven by the motor. The first and second rails may have different hardness. A first bearing is disposed underneath the first rail, whereas second and third bearings are disposed on the first rail between the support housing and the first rail.

16 Claims, 2 Drawing Sheets

SLIDE MITER SAW

This application claims the benefit of U.S. Provisional Application No. 60/411,977, filed Sep. 19, 2002, now pending.

FIELD OF THE INVENTION

This invention relates generally to slide miter saws and specifically to bearing arrangements for slide miter saws.

BACKGROUND OF THE INVENTION

Slide miter saws are well known in the art as they provide extended cutting range over non-sliding miter saws. Like non-sliding miter saws, the slide miter saws have a base, a rotatable table attached to the base, a saw assembly including a motor and a blade driven by the motor, where the saw assembly is pivoted downwardly for cutting a workpiece disposed on the base and table. However, slide miter saws enable the user to move the saw assembly horizontally along the table.

Most slide miter saws accomplish this by connecting the saw assembly to at least one rail, which is slidably attached to a support housing connected to the table (see, e.g., U.S. Pat. No. 6,067,885). With such arrangement, the user would pull the saw assembly forwardly, move the saw assembly downwardly, then push the saw assembly rearwardly for cutting the workpiece.

SUMMARY OF THE INVENTION

In accordance with the present invention, an improved miter saw is employed. The miter saw includes a base, a table, a support housing connected to the table, first and second rails slidably connected to the support housing, the first and second rails having different hardness, a trunnion disposed on the first and second rails, a saw assembly pivotally attached to the trunnion and movable between a front position and a rear position, the saw assembly comprising a motor and a blade driven by the motor, a first bearing disposed underneath the first rail, and second and third bearings disposed on the first rail between the support housing and the first rail, one of the first, second and third bearings being biased into contact with the first rail by a first screw, and another of the first, second and third bearings being biased into locking contact with the first rail by a second screw.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIGS. 4A–4B are side, front and top plan views of the bearing, respectively.

DETAILED DESCRIPTION

Figure 1:
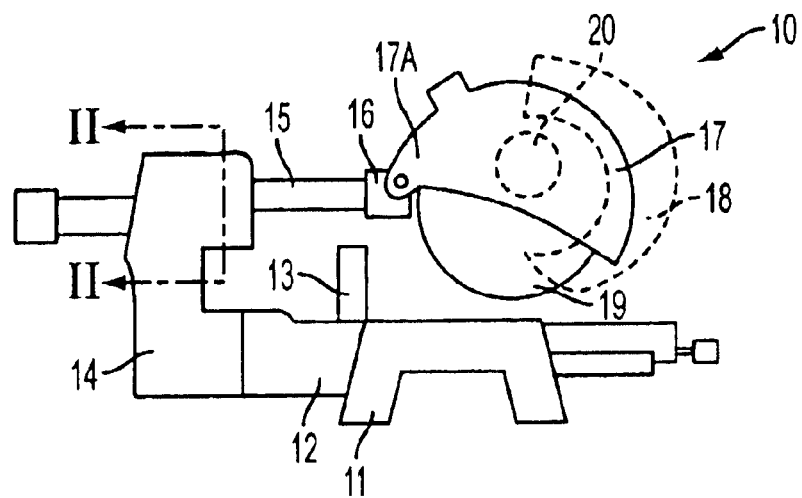
FIG. 1 is a side view of a slide miter saw according to the invention.

The invention is now described with reference to the accompanying figures, wherein like numerals designate like parts. Referring to FIG. 1, a slide miter saw 10 preferably has a base 11, a table 12 rotatably connected to the base 11, a support housing 14 pivotally connected to table 12, two rails 15 slidably connected to the support housing 14, a trunnion 16 attached to one end of the rails 15, and a saw assembly pivotably attached to trunnion 16 via pivot arm 17A, where the saw assembly comprises a motor 20, a blade 19 driven by the motor, an upper blade guard 17 for covering an upper part of blade 19, and a lower blade guard 18 pivotally attached to the upper blade guard 17 for covering a lower part of blade 19. The slide miter saw 10 may also have a fence 13 attached to the base 11. These elements are well known in the art. Persons skilled in the art are referred to U.S. Pat. No. 6,067,885, which is wholly incorporated by reference herein.

Typically, miter saws have rails 15 having the same hardness. It is however less expensive to use rails having different hardness, as softer rails are less expensive than harder rails. Accordingly, miter saw 10 has a hard rail 15H and a soft rail 15S. Preferably, the hard rail 15H has a hardness between about 58 HRC and about 62 HRC. The soft rail 15S may have a hardness lower than about 58 HRC and preferably below about 50 HRC. In the preferred embodiment, hard rail 15H and soft rail 15S may be made of chrome-plated hardened steel and chrome-plated soft steel, respectively.

Hard rail 15H is slidably connected to support housing 14. A bearing 38 may be disposed between hard rail 15H and support housing 14 to enhance the sliding action of hard rail 15H relative to support housing 14. Preferably, bearing 38 is a recirculating linear ball bearing.

Similarly, soft rail 15S is slidably connected to support housing 14, and slidably disposed within channel 14C of support housing 14. A bearing may be disposed between soft rail 15S and support housing 14 to enhance the sliding action of soft rail 15S relative to support housing 14. While such bearing may be a recirculating linear ball bearing, it is preferable to use a less expensive alternative.

One possible arrangement includes bearings 31, 32 and 34, which are preferably made of powdered metal bronze. Bearings 31 are preferably disposed underneath soft rail 15S on bosses 14B of support housing 14. Persons skilled in the art should nevertheless recognize that bosses 14B may be replaced by screws extending into channel 14C.

In addition, bearing 34 maybe disposed on soft rail 15S. A lock bolt 35 threadingly engaged to support housing 14 may force bearing 34 against soft rail 15S. Accordingly, if the user wants to lock the rails 15 so that the saw assembly cannot slide relative to table 12, the user need only tighten lock bolt 35. Because lock bolt 35 does not contact soft rail 15S directly, any material can be used for the lock bolt 35 as lock bolt 35 cannot score soft rail 15S. Thus, lock bolt 35 can be made of steel, rather than, e.g., brass. Persons skilled in the art shall recognize that bearing 34 may be disposed underneath soft rail 15S.

Similarly, bearing 32 is preferably disposed on soft rail 15S. A set screw 33 threadingly engaged to support housing 14 may force bearing 32 against soft rail 15S (which in turn may force soft rail 15S against bearings 31). Because set screw 33 does not contact soft rail 15S directly, any material can be used for the set screw 33 as set screw 33 cannot score soft rail 15S. Persons skilled in the art shall recognize that bearing 32 may be disposed on a boss instead if at least one bearing 31 is disposed on a set screw.

Figure 4A:
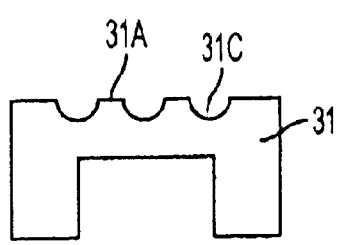
FIGS. 4A–4C illustrate a bearing according to the invention, where
Figure 4B:
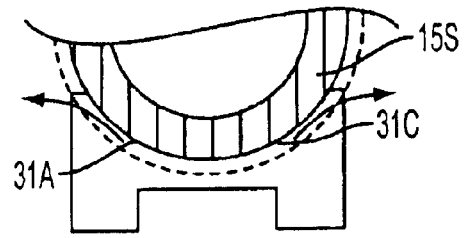
Figure 4C:
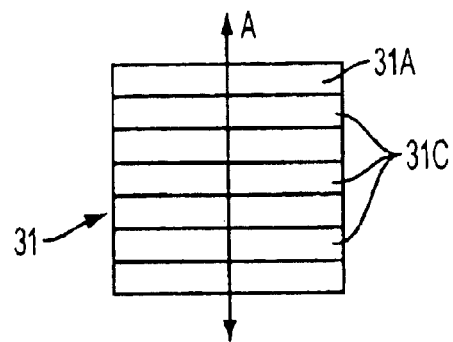

Bearings 31, 32, 34 may have dust channels to help move dust away from the area where the bearing contacts the rail 15S. Referring to FIG. 4, bearing 31 has channels 31C disposed underneath contact surface 31A. Channels 31C are preferably substantially perpendicular to the longitudinal axis of soft rail 15S and/or to the movement direction A of soft rail 15S. Persons skilled in the art shall recognize that dust channels may also be disposed on bearings 32, 34.

Preferably, bearings 31, 32, 34 are substantially coplanar. The plane containing the bearings is preferably substantially vertical. Persons skilled in the art shall recognize that this plane may be substantially horizontal.

Persons skilled in the art should also recognize that bearings 31, 32, 34 may have the same dimensions, in order to minimize the number of different parts used in the saw.

Figure 2:
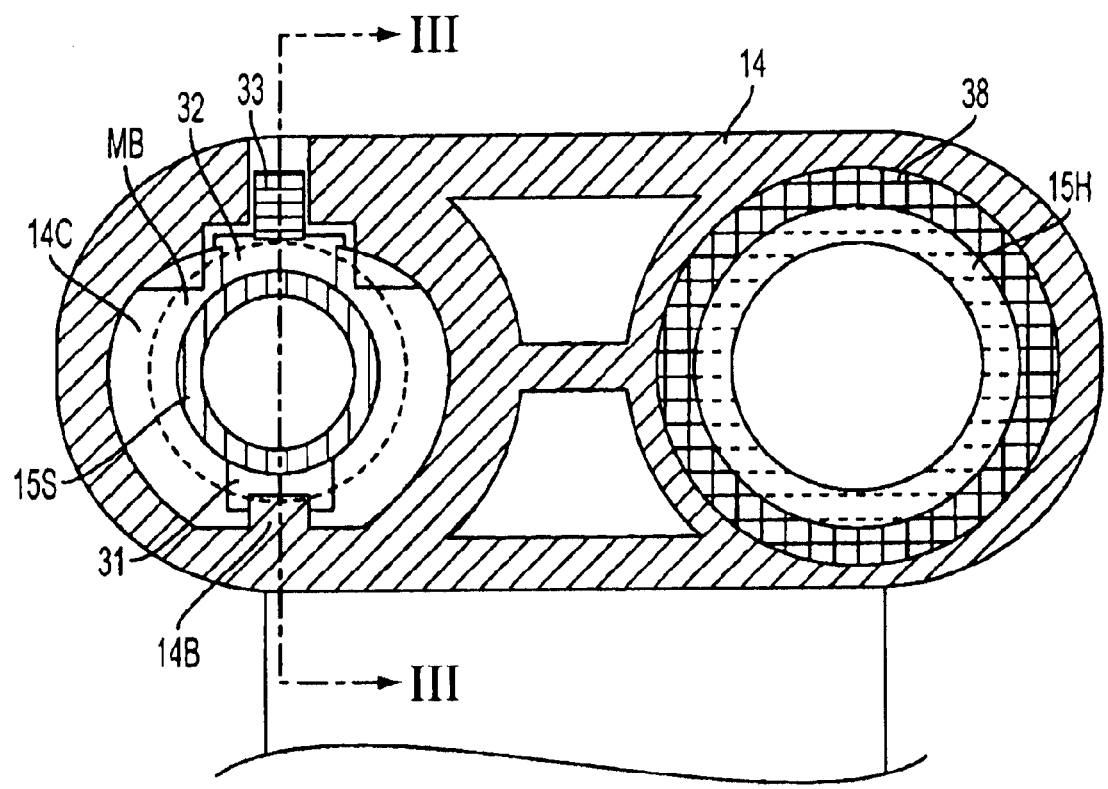
FIG. 2 is a partial cross-sectional view along line II—II of FIG. 1.
Figure 3:
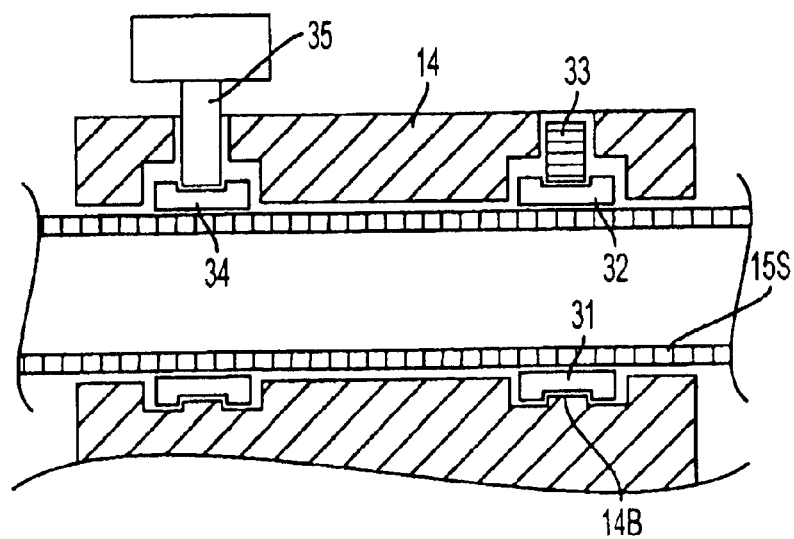
FIG. 3 a partial cross-sectional view along line III—III of FIG. 2.

Support housing 14 is preferably made of cast aluminum. In order to ensure that bearings 31 are substantially aligned, it is preferable that bosses 14B be machined. This can be achieved by a boring operation along volume MB, as shown in FIG. 2. This boring operation is advantageous as it simultaneously machines bosses 14B and removes any imperfections which could contact soft rail 15S.

Persons skilled in the art may recognize other additions or alternatives to the means disclosed herein. However, all these additions and/or alterations are considered to be equivalents of the present invention.

We claim:

1. A miter saw comprising:

a base;

a table rotatably disposed on the base;

a support housing connected to the table;

first and second rails slidably connected to the support housing;

a trunnion disposed on the first and second rails;

a saw assembly pivotally attached to the trunnion and movable between a front position and a rear position, the saw assembly comprising a motor and a blade driven by the motor;

a first bearing disposed underneath the first rail; and second and third bearings disposed on the first rail between the support housing and the first rail, wherein one of the first, second and third bearings is biased into contact with the first rail by a first screw, and another of the first, second and third bearings being biased into locking contact with the first rail by a second screw, the first, second and third bearings being separate and spaced apart from each other.

2. The miter saw of claim 1, wherein the first bearing has at least one channel substantially perpendicular to a longitudinal axis of the first rail.

3. The miter saw of claim 1, wherein the first and second rails have different hardness.

4. The miter saw of claim 1, wherein the first bearing is disposed on a boss within the support housing.

5. The miter saw of claim 4, wherein the boss is machined when the support housing is bored.

6. The miter saw of claim 1, further comprising a fourth bearing disposed underneath the first rail.

7. The miter saw of claim 6, wherein the fourth bearing is disposed on a boss within the support housing.

8. The miter saw of claim 7, wherein the boss is machined when the support housing is bored.

9. The miter saw of claim 1, wherein the first rail is softer than the second rail.

10. The miter saw of claim 1, further comprising a fifth bearing disposed within the support housing, said fifth bearing contacting the second rail.

11. The miter saw of claim 10, wherein the fifth bearing is a recirculating linear bearing.

12. The miter saw of claim 10, wherein the fifth bearing is a recirculating linear ball bearing.

13. The miter saw of claim 1, wherein at least one of the first, second and third bearings is made of powdered metal bronze.

14. The miter saw of claim 1, wherein a plane intersects the first, second and third bearings.

15. The miter saw of claim 14, wherein the plane is substantially vertical.

16. The miter saw of claim 14, wherein the plane is substantially horizontal.

* * * * *